United States Patent
Lin et al.

(10) Patent No.: US 9,203,623 B1
(45) Date of Patent: Dec. 1, 2015

(54) APPARATUS AND METHODS FOR KEYWORD PROXIMITY MATCHING

(75) Inventors: Yingqiang Lin, San Jose, CA (US); Dehua Tan, San Jose, CA (US); Liwei Ren, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 1340 days.

(21) Appl. No.: 12/642,613

(22) Filed: Dec. 18, 2009

(51) Int. Cl.
 *G06F 17/30* (2006.01)
 *H04L 9/32* (2006.01)

(52) U.S. Cl.
 CPC .................................. *H04L 9/32* (2013.01)

(58) Field of Classification Search
 USPC .................................................. 707/706, 749
 See application file for complete search history.

(56) References Cited

U.S. PATENT DOCUMENTS

| | | | |
|---|---|---|---|
| 6,493,709 B1 | 12/2002 | Aiken | |
| 6,584,470 B2 | 6/2003 | Veale | |
| 6,718,333 B1 * | 4/2004 | Matsuda | 715/234 |
| 6,775,669 B2 * | 8/2004 | Uesaka | 707/706 |
| 6,782,383 B2 * | 8/2004 | Subramaniam et al. | 707/706 |
| 6,907,424 B1 * | 6/2005 | Neal et al. | 707/706 |
| 7,031,972 B2 | 4/2006 | Ren et al. | |
| 7,165,080 B2 * | 1/2007 | Kotcheff et al. | 707/706 |
| 7,277,883 B2 * | 10/2007 | DeVorzon et al. | 707/706 |
| 7,363,308 B2 * | 4/2008 | Dillon et al. | 707/706 |
| 7,516,130 B2 | 4/2009 | Ren et al. | |
| 7,886,359 B2 * | 2/2011 | Jones et al. | 726/26 |
| 7,996,910 B2 * | 8/2011 | Toomey | 726/26 |
| 8,011,003 B2 * | 8/2011 | Rowney et al. | 726/13 |
| 2003/0120647 A1 | 6/2003 | Aiken et al. | |
| 2003/0172066 A1 | 9/2003 | Cooper et al. | |
| 2004/0162786 A1 | 8/2004 | Cross et al. | |
| 2006/0253439 A1 | 11/2006 | Ren et al. | |

OTHER PUBLICATIONS

Sharif, Muhammad et al. "Multiple Values Search Algorithm" Fall 2007-Spring 2008, pp. 49-58, vol. 1, No. 2, Journal of Information & Communication Technology.

Chakrabarti, Saumen et al. "Scalable feature selection, classification and signature generation for organizing large text databases into hierachical taxonomies", 1998, pp. 163-178, vol. 7, No. 3, VLDB Journal.

Anagnostopoulos, Aris et al. "Sampling Search-Engine Results", May 10-14, 2005, pp. 245-256, Proceedings of the 14th International Conference on World Wide Web, Chiba, Japan.

(Continued)

*Primary Examiner* — Kim Nguyen
(74) *Attorney, Agent, or Firm* — Okamoto & Benedicto LLP (57) ABSTRACT

One embodiment relates to an apparatus configured to match a list of keywords against a target document. The apparatus includes data storage configured to store computer-readable instruction code and data, and a processor configured to access the data storage and to execute said computer-readable instruction code. The apparatus further includes a keyword searcher and a keyword object generator. The keyword searcher is configured to receive the list of keywords and a textual string corresponding to the target document file, and search the textual string for instances of the keywords so as to generate a sequence of keyword instances. The keyword object generator implemented using the instruction code and configured to receive the sequence of keyword instances, and generate a keyword object, wherein the keyword object includes a range-dependent match function. Other embodiments and features are also disclosed.

14 Claims, 6 Drawing Sheets

(56) References Cited

OTHER PUBLICATIONS

Chen, Jianhong et al. "Knowledge Discovery and Data Mining Based on Power Plant Real-Time Database: A Survey", Oct. 8-12, 2001, pp. 1-5, Proceedings of International Conference on Power Engineering, Zhejiang University, China.

Chen, Liang et al. "Template Detection for Large Scale Search Engines", Apr. 23-27, 2006, 5 pgs., SAC '06, Dijon, France.

Hamilton, Nigel "The Mechanics of a Deep Net Metasearch Engine", 2003, 2 pgs., Proceedings of the 12th International World Wide Web Conference.

Jessop, Mark et al. "Pattern Matching Against Distributed Datasets", 2004, 6 pgs. Dept. of Computer Science, University of York, United Kingdom.

Lai, Wei Cheng et al. "An Anatomy of a Large-Scale Image Search Engine", Dec. 2002, 4 pgs., IEEE MSE, Santa Barbara, California.

Lavrenko, Victo et al. "Relevance Models for Topic Detection and Tracking", 2002, 6 pgs., Dept. of Computer Science, University of Massachussetts, MA.

Pallickara, Shrideep et al. "Incorporating an XML Matching Engine in Distributed Brokering Systems", 2003, pp. 1-7, Proceedings of the International Conference on Parallel and Distributed Processing Techniques and Applications, (PDPTA '03).

Schleimer, Saul et al. "Winnowing: Local Algorithms for Document Fingerprinting", Jun. 9-12, 2003, 10 pgs. SIGMOD.

Bloom Filters—the math, pp. 1-6, [retrieved on May 6, 2008]. Retrieved from the internet: http://pages.cs.wisc.edu/cao/papers/summary-cache/node8.html, dated 1998.

\* cited by examiner

APPARATUS AND METHODS FOR KEYWORD PROXIMITY MATCHING

BACKGROUND OF THE INVENTION

1. Field of the Invention

The present invention relates generally to keyword matching techniques as may be used for data leakage prevention and other applications.

2. Description of the Background Art

Loss of proprietary information and intellectual property can trigger fines, litigation, brand damage, and bad press. To protect sensitive data, enterprises need an effective data leakage prevention (DLP) solution which monitors potential information leaks at the point of use. However, the explosion of messaging systems, wireless networking, and universal serial bus (USB) storage devices has made the protection of critical enterprise data difficult. As a result, enterprises are experiencing an increase in the loss and even theft of data assets by employees or contractors or even hackers (and malwares) who maliciously or accidentally leak data.

It is highly desirable to improve techniques which facilitate data leakage prevention and other applications.

SUMMARY

One embodiment relates to an apparatus configured to match a list of keywords against a target document. The apparatus includes data storage configured to store computer-readable instruction code and data, and a processor configured to access the data storage and to execute said computer-readable instruction code. The apparatus further includes a keyword searcher and a keyword object generator. The keyword searcher is configured to receive the list of keywords and a textual string corresponding to the target document file, and search the textual string for instances of the keywords so as to generate a sequence of keyword instances. The keyword object generator implemented using the instruction code and configured to receive the sequence of keyword instances, and generate a keyword object, wherein the keyword object includes a range-dependent match function.

Another embodiment relates to a method for matching a list of keywords against a target document, the method being performed using a computer including at least a processor, data storage, and computer-readable instructions. A computer-implemented keyword searcher receives a textual string corresponding to a target document file and also receives a list of keywords. The keyword searcher searches the string for instances of the keywords so as to generate a sequence of keyword instances. The sequence of keyword instances is received by a computer-implemented keyword object generator. The keyword object generator generates a keyword object, wherein the keyword object includes a range-dependent match function.

Another embodiment relates to an apparatus configured for data leakage prevention. The apparatus includes data storage configured to store computer-readable instruction code and data, and a processor configured to access the data storage and to execute said computer-readable instruction code. A matching service is implemented using the instruction code and configured to apply keyword proximity matching to match a collection of keywords against contents of a computer-readable document to detect whether the document contains sensitive information related to the keywords. The keyword proximity matching is implemented using range-dependent matching.

These and other features of the present invention will be readily apparent to persons of ordinary skill in the art upon reading the entirety of this disclosure, which includes the accompanying drawings and claims.

DETAILED DESCRIPTION

Example Computer

Figure 1:
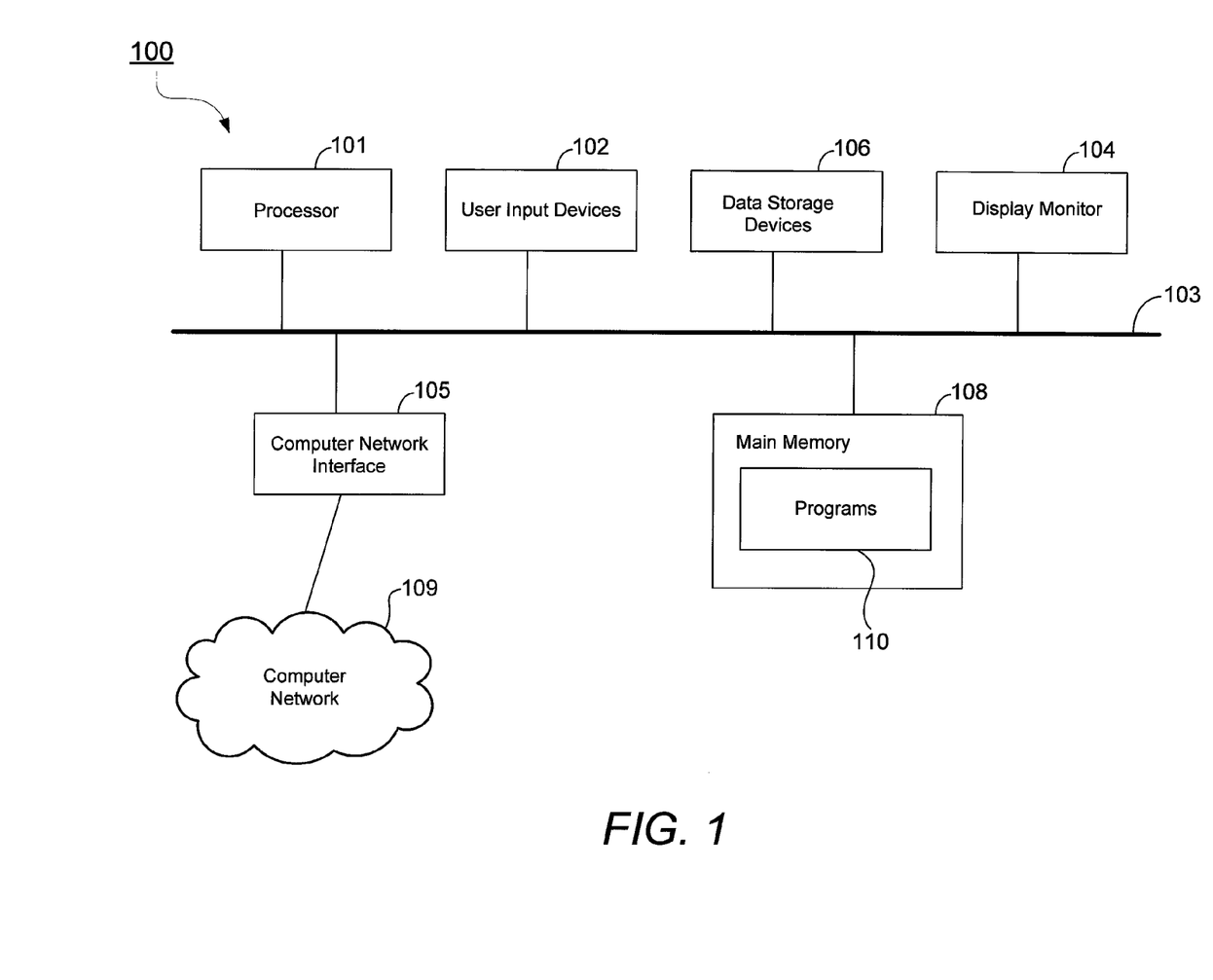
FIG. 1 is a schematic diagram of an example computer that may be used in embodiments of the present invention.

Referring to FIG. 1, there is shown a schematic diagram of an example computer that may be used in embodiments of the present invention. The computer shown in the example of FIG. 1 may be employed as a client computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse, etc.), a display monitor 104 (e.g., LCD, cathode ray tube, flat panel display, etc.), a computer network or communications interface 105 (e.g., network adapters, wireless network adapters, etc.) for communicating over a computer (data) network 109, one or more data storage devices 106 (e.g., hard disk drive, optical drive, FLASH memory, etc.) for storing computer-readable data onto computer-readable media and for reading the data therefrom, and a main memory 108 (e.g., DRAM, SRAM, etc.).

Computer-readable data (including computer-readable program instructions) may be stored in the data storage devices 106 and may be loaded into main memory 108. Computer-readable data may also be received over the computer network 109 by way of a communications interface 105. In particular, the main memory 108 may loaded with programs 110 (comprising computer-readable instruction code and data) which may be executed by the processor 101 to perform some of the functionalities as described herein.

Example System

Figure 2:
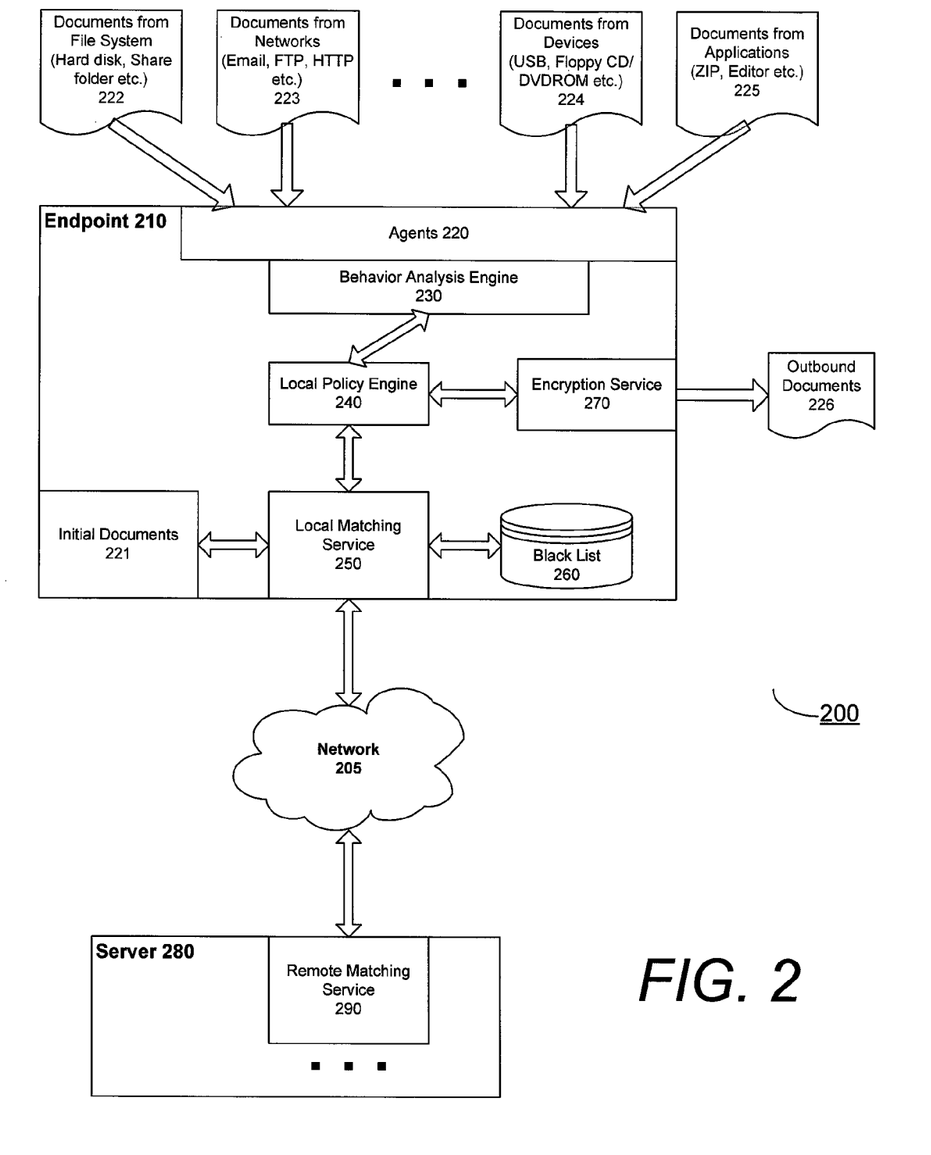
FIG. 2 is a schematic diagram of an example enterprise document management system within which the technique disclosed herein may be practiced in accordance with an embodiment of the invention.

FIG. 2 is a schematic diagram of an example enterprise document management system 200 within which the matching technique disclosed herein may be practiced in accordance with an embodiment of the invention. The system 200 manages documents in an enterprise network and prevents sensitive information leakages. The disclosed matching technique is also applicable in other systems.

The system 200 includes at least one endpoint 210 and a server 280. The endpoint 210 may be a computer (e.g., laptop computers, desktop computers) or a device with data access capabilities (e.g., handheld computing devices, embedded devices with a processor and operating or control system). The server 280 functions as a central place of control for the system 200. Each of the endpoints 210 is connected to the server 280 through a network 205. The network 205 may be a wired or wireless network. Examples of the network 205 include the Internet, an intranet, a cellular network, or a combination thereof. It is noted that each of the endpoint 210 and the server 280 may be structured to include a processor, memory, storage, network interfaces, an applicable operating system, and other functional software programs (e.g., network drivers, communication protocols, applications, etc.) to implement the techniques disclosed herein.

In the embodiment shown, the endpoint 210 includes one or more agents 220, a behavior analysis engine 230, a local policy engine 240, a local matching service 250, a black list 260, an encryption service 270, a local index database (not shown), and some optional initial documents 221. The behavior analysis engine 230 communicatively couples the agents 220 and the local policy engine 240. The local policy engine 240 communicatively couples the behavior analysis engine 230, the encryption service 270, and the local matching service 250. The local matching service 250 has access to the optional initial documents 221, the black list 260, the local index database, and the network 205.

The agents 220 may be configured as software elements running at the endpoint 210 to perform one or more filtering functions. Examples of the agents 220 include file system filter drivers (also known as file system agent), network filter drivers (also known as network agent), device I/O filter drivers (also known as device I/O agent), and API hooking service. The agents 220, through application of its one or more filters, are configured to identify ("catch") documents in motion at the endpoint 210. Documents in motion are documents being presently processed by the endpoint 210. For example, a document being copied from a local hard disk of the endpoint 210 to a removable drive is a document in motion. Documents in motion include inbound documents and outbound documents 226.

The inbound documents include documents from file system 222, documents from networks 223, documents from devices 224, documents from applications 225, and the like. The documents from file system 222 are documents loaded (or retrieved) from a local file system(s) of the endpoint 210 such as local hard disk, shared folders, etc. The documents from networks 223 are documents downloaded (or retrieved) from a network(s), such as documents attached in an email, downloaded via File Transfer Protocol (FTP), or HTTP. The documents from devices 224 are documents loaded (or retrieved) from input/output storage devices, for example, USB drives, floppy drives, CD/DVD ROM drives, and other devices connected to the endpoint 210. The documents from applications 225 are documents generated by applications such as file editors, zip/unzip utilities, user's own applications, copy/move utilities, and the like.

The outbound documents 226 are documents to be exported out of the endpoint 210. The destination of the outbound documents 226 may be a device such as a USB drive, an email recipient, a network storage device, a printer, or other devices of similar nature. In one embodiment, the destinations of an outbound document 226 include local storage devices of the endpoint 210, for example, a removable local hard disk.

The behavior analysis engine 230 may be configured to analyze the behaviors of all active applications in the endpoint 210. It may be configured to identify documents relevant to the document in motion identified by the agent 220. The behavior analysis engine 230 may also be configured to keep track and analyze certain user process activities captured by the agents, such as print/print-screen, copy/cut and paste, send via email, upload through network, save/save-as, and the like. It can identify user behaviors such as intentional scrambling of sensitive documents based on the current user process activity, the analysis, and a collection of activity-to-behavior patterns.

The local policy engine 240 is configured to contain security policies. The security policies define a set of restrictions on document access and control (e.g., limiting access or modification rights of certain sensitive documents to certain categories of users), device input/output (I/O) (e.g., block exportation of sensitive documents without encryption), and certain user behaviors (e.g., prohibiting duplicating the content of sensitive documents). In one embodiment, the security policies are defined and maintained in a central policy service in the server 280 and are synchronized with the local policy engine 240 when the endpoint 210 boots up (or is otherwise initialized). The local policy engine 240 may also be configured to determine how a document is analyzed to detect sensitive information.

The black list 260 is a list of records associated with sensitive documents. It may be configured to keep track of all sensitive documents detected by the local matching service 250. The black list 260 may be stored in a relational database or any other type of database, or even in a plain structured file.

Each record of the black list 260 may hold information related to the associated sensitive document. For example, each record may have a file identifier (file ID), a file full path name, and matching information. The matching information may include, for example, a matching flag. The matching flag may be as simple as a true-false indicator of whether the associated document has been matched by the local matching service 250 and/or the remote matching service 290.

Various types of matching techniques may be used, either alone or in combination, by the matching services in the system. One type of matching technique is keyword matching. Keyword matching is of particular relevance to the present disclosure.

Keyword matching detects whether a document contains sensitive information by matching a collection of keywords related to sensitive information with the content of the document. The collection of keywords may be set by authorized users in the server 280 and later synchronized with the local matching service 250 of endpoints 210 within the system 200. Alternatively, the collection of keywords may be determined by the remote matching service 290 based on user configurations.

In accordance with an embodiment of the invention, the local matching service 250 may be configured to detect sensitive documents. In some implementations, the local matching service 250 may work together with a remote matching service 290 to detect the sensitive documents. The local matching service 250 may use a variety of matching techniques to detect sensitive documents. In some embodiments, the local policy engine 240 determines the matching techniques for the local matching service 250.

In one embodiment, the local matching service 250 first conducts a keyword matching or a named entity recognition matching on a document in motion (also known as target document). If the result of the matching suggests that the target document is a sensitive document, the local matching service 250 may transmit the document to the remote matching service 290 for further detection, depending on how matching policies are defined.

The initial documents (documents at rest) 221 may include all the files residing on the storage of the endpoint 210 before the system 200 is installed in the endpoint 210. The initial documents may include both sensitive documents and documents that do not contain sensitive information. In one embodiment, the local matching service 250 scans the storage of the endpoint 210 for the initial documents 221 and processes them for sensitive information detection.

The encryption service 270 may be configured to encrypt sensitive outbound documents before sending them to their destination sites. The destination sites may be an external device such as a USB drive, an email recipient, a network storage device, and the like.

Keyword Proximity Matching

As described above, keyword matching is a matching technique which may be utilized, for example, in an enterprise document management system for data leakage prevention. Keyword matching may also be advantageously utilized in other applications. In some applications, it is desirable to take into account proximity information during keyword matching. Keyword matching which takes into account proximity information is referred to herein as "keyword proximity matching."

Web search engines utilize a form of keyword proximity matching. However, applicants have determined that those techniques cannot be used directly in DLP applications. The present disclosure provides a novel and inventive techniques for keyword proximity matching.

The techniques described in the present disclosure are particularly suited for use in DLP applications. In accordance with an embodiment of the invention, the use of proximity information advantageously provides for keyword matching in a manner which reduces false positive matches by a DLP system. In addition, the use of proximity information advantageously enables the creation of well-defined regulatory compliance templates for use in a DLP system.

Keyword Proximity Matching Module and Keyword Objects

Figure 3:
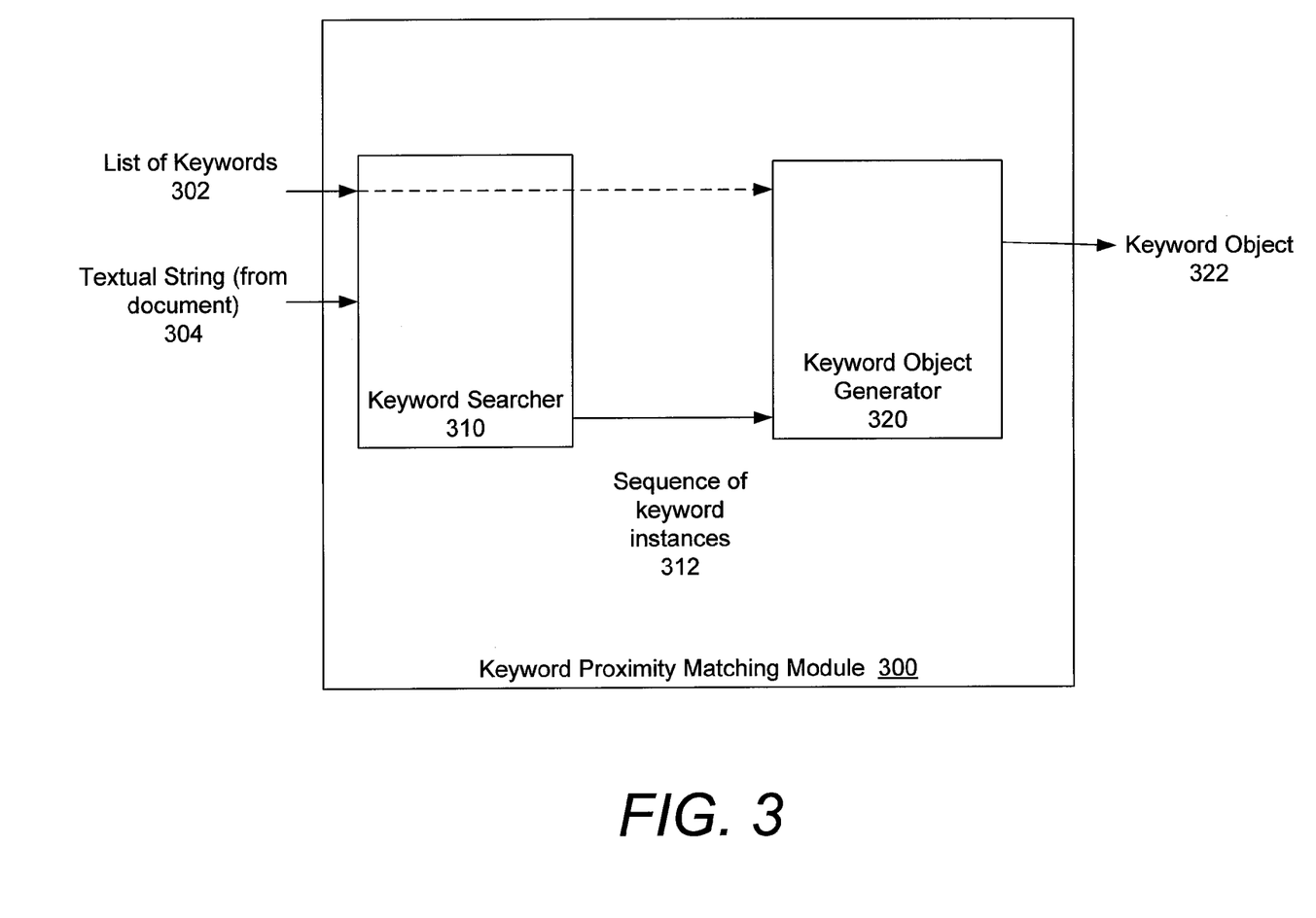
FIG. 3 is a diagram of a keyword proximity matching module in accordance with an embodiment of the invention

FIG. 3 is a high-level diagram of a keyword proximity matching module 300 in accordance with an embodiment of the invention. The keyword proximity matching module 300 may be utilized, for example, by the local matching service 250 in the system 200 of FIG. 2, or by other systems in need of keyword matching functionality.

As shown in FIG. 3, the keyword vicinity matching module 300 may include a keyword searcher 310 and a keyword object generator 320. The inputs to the keyword vicinity matching module 300 include a list of keywords (keyword dictionary) 302 and a textual string 304. The list of keywords 302 preferably includes a numeric score assigned to each keyword. The textual string 304 generally corresponds to a target document that is to be checked for the presence of the listed keywords in sufficiently close proximity to each other (and optionally in the same order as listed).

The keyword searcher 310 is configured to receive the inputs and generate a sequence of keyword instances 312. The keyword instances correspond to the keyword matches found in the textual string 304. Each keyword instance may include the following data: a keyword identifier (KID) and a position offset (P) of the instance in the textual string 304. In other words, each keyword instance may be represented by <KID, P>. The sequence of keyword instances is preferably output in ascending order of the position offsets.

The keyword object generator 320 is configured to receive the sequence of keyword instances 312 and also to receive (or have access to) the keyword dictionary 304. The keyword object generator 320 generates a keyword object 322.

Figure 4:
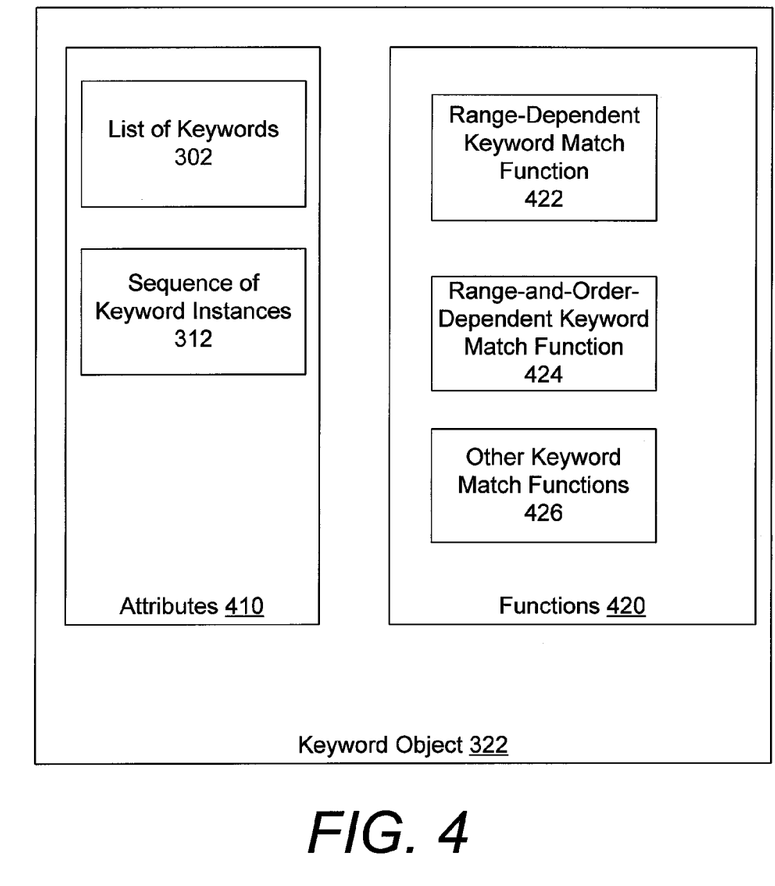
FIG. 4 is a diagram of a keyword object in accordance with an embodiment of the invention

FIG. 4 is a diagram of a keyword object 322 in accordance with an embodiment of the invention. A keyword object instance may be accessed by the local matching service 250 (or other program) by calling its functions. For example, a keyword object instance for a particular list of keywords and a particular target document may be accessed by the local matching service 250 to determine whether or not specified match conditions are met. The specified match conditions may be, for example, that: a) all listed keywords are matched (found); b) any of the listed keywords is matched; c) at least a specified number of keywords are matched; d) a total numeric score of the matches found exceeds a specified threshold; e) all listed keywords are matched within a specified range of characters; or f) all listed keywords are matched in order within a specified range of characters.

Each keyword object 322 includes attributes 410 and functions 420. The attributes 410 include the list of keywords 302 and the sequence of keyword instances 312. The functions 420 may include a range-dependent keyword match function 422, a range-and-order dependent keyword match function 424, and other keyword match functions 426. The other keyword match functions 426 may include, for example, a function to match all keywords, a function to match any keyword, a function to match at least Y keywords (where Y is a positive integer less than the total number of keywords in the list), and a function which determines if a total numeric score of matched keywords exceeds a specified threshold score.

The present disclosure focuses on the more difficult functions, which are the range-dependent keyword match function 422 and the range-and-order dependent keyword match function 424. The range-dependent keyword match function 422 is described below in relation to Tables 1 and 2 and FIG. 5. The range-and-order-dependent keyword match function 424 is described below in relation to Tables 3 and 4 and FIG. 6.

Range-Dependent Keyword Matching

The range-dependent keyword match function 422 may be configured to determine whether or not all listed keywords are matched (regardless of order) within a specified range of characters. For one implementation of the range-dependent keyword match function 422, the inputs and outputs of the function are given below in Table 1, and pseudo-code instructions showing the steps of the algorithm applied are given below in Table 2.

Input:
1. The number M as the size of the keyword dictionary
2. A keyword instance sequence S={<KID[s], P[s]>|1≤s≤N} where {P[s]|1≤s≤N} in strictly ascending order
3. Positive integer R which is the position range within the matched keywords are to be found Output:
NULL or the matched sequence {O[j]|1≤j≤M}

Table 1

Pseudo-Code Instructions:
1. If N<M, return NULL
2. Initialize a sequence {O[j]|1≤j≤M} with all values as −∞.
3. Set C=0
4. FOR s=1 TO N
5. IF O[KID[s]]=−∞, let C=C+1

6. Set O[KID[s]]=P[s]
7. IF C≥M, THEN
   a. Let MIN=Min{O[j]}
   b. IF P[s]−MIN≤R, return the sequence {O[j]|1≤j≤M}
8. END FOR
9. Return NULL Table 2

As shown in Table 1, the inputs to the range-dependent keyword matching function may include: the size (M) of the keyword dictionary; the keyword instance sequence (S={<KID[s],P[s]>|1≤s≤N}) which is ordered in ascending order by position (P); and the range (R) of characters within which all the keywords are to be found. The outputs of the range-dependent keyword matching function may include: NULL if the match conditions are not met (i.e. all the keywords were not found within the specified range); and an output sequence {O[j]|1≤j≤M} of position offsets for the matched keywords if the match conditions are met (i.e. all the keywords were found within the specified range).

As shown in Table 2, the first pseudo-code instruction (1) determines if the number N of keyword instances in the keyword instance sequence is less than the number of keywords in the list. If so, then the match conditions cannot be met, so the function may return a NULL value to indicate that no match is found.

The second pseudo-code instruction (2) initializes the output sequence {O[j]|1≤j≤M} with all values of the sequence initially at −∞ (or any other predetermined value that indicates no match has yet been found). The third pseudo-code instruction (3) initializes a count C at zero.

The fourth pseudo-code instruction (4) indicates the start of an instruction loop which is performed up to N times (once per keyword instance). The first time the instruction loop is performed the pointer s=1, and the pointer s is incremented by one for each subsequent performance of the loop. The fifth through seventh pseudo-code instructions (5, 6, and 7) are performed within the instruction loop.

Within the loop, for keyword instances, the fifth pseudo-code instruction (5) determines if O[KID[s]]=−∞ (which would indicate that the keyword associated with the current keyword instance has not been previously found in the sequence). If so, then the count C is incremented by one (which indicates that the keyword associated with the current keyword instance has been found at least once in the sequence). The sixth pseudo-code instruction (6) sets O[KID[s]]=P[s] (which is the offset position for the current keyword instance). The seventh pseudo-code instruction (7) then determines if the count C≥M (which indicates that all listed keywords have been found at least once). If C≥M, then the procedure performs pseudo-code sub-instructions 7a and 7b. If C<M, then the procedure skips pseudo-code sub-instructions 7a and 7b and goes to the eighth pseudo-code instruction (8).

Pseudo-code sub-instruction 7a sets a minimum offset MIN to the lowest numbered position offset of the set {O[j]}. Pseudo-code instruction 7b then determines whether the difference between P[s] and MIN is less than or equal to the range R. If so, then the match conditions have been met, so the function returns the output sequence {O[j]|1≤j≤M}. By returning this output sequence, the function indicates that all the keywords were found within the specified range, and the values in the output sequence give the position offsets for the matching keyword instances. In particular, O[1] gives the offset for the matching keyword instance with KID[1], O[2] gives the offset for the matching keyword instance with KID[2], . . . , and O[M] gives the offset for the matching keyword instance with KID[M]). If not, then the procedure goes to the eighth pseudo-code instruction (8).

The eighth pseudo-code instruction (8) indicates the end of the instruction loop. If the pointer s<N, then the procedure increments the pointer s by one (as mentioned above) and goes back to perform another iteration of the instruction loop. If the pointer s=N, then the instruction loop has been performed N time, so the procedure goes on to the ninth pseudo-code instruction (9) which causes the function to return a NULL value. The NULL value indicates that not every listed keywords was found within the specified range.

Figure 5:
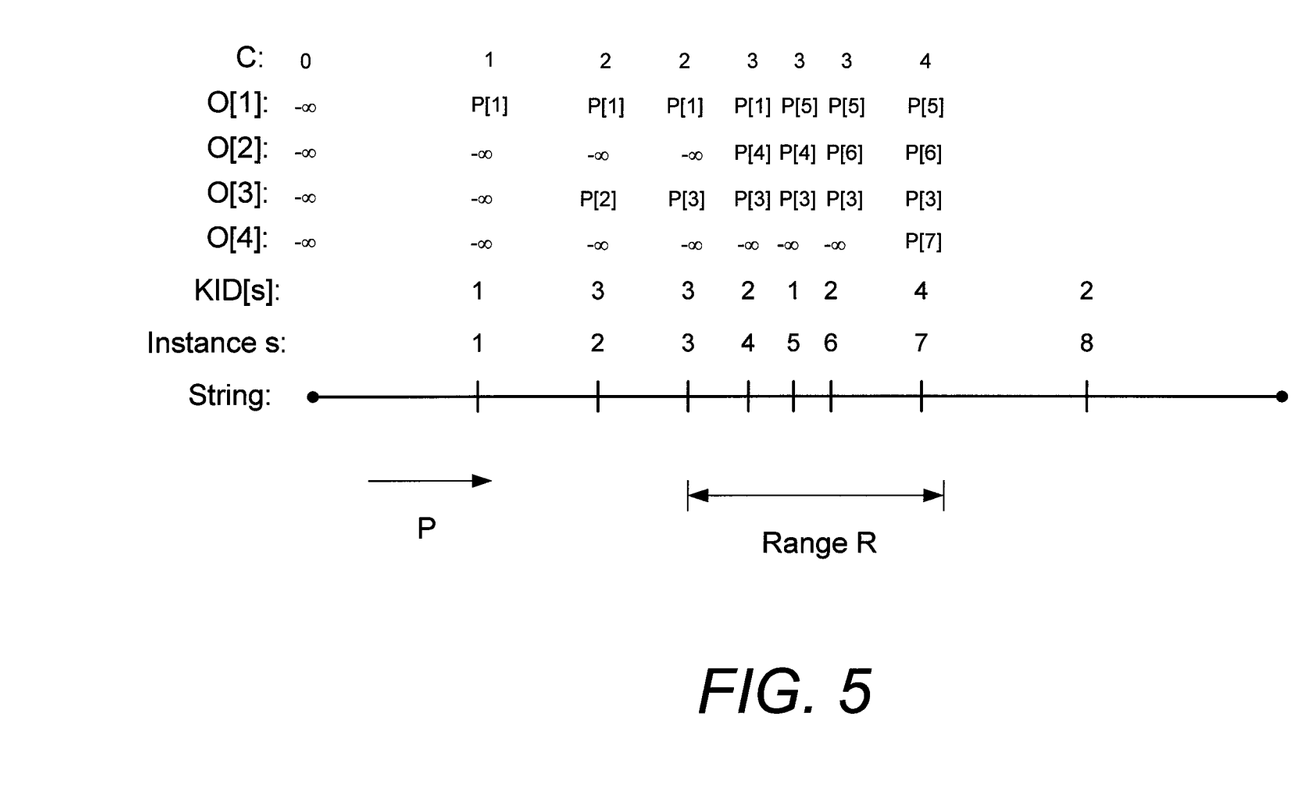
FIG. 5 shows a representation of an example sequence of keywords to which a range-dependent keyword match function may be applied in accordance with an embodiment of the invention.

FIG. 5 shows a representation of an example sequence of keywords to which a range-dependent keyword match function may be applied in accordance with an embodiment of the invention. The input string is represented by the line segment shown, where the position on the line segment represents the offset position P in the string. In this example, the keyword instance sequence (S={<KID[s],P[s]>|1≤s≤8}) generated from the string is indicated by the tick marks numbered with instance pointer s going from 1 through 8. The example keyword dictionary lists four keywords (i.e. M=4), and those four keywords in order have KID=1, 2, 3 and 4, respectively.

Consider the pseudo-code procedure of Table 2 being performed on the example sequence in FIG. 5. After initializing {O[j]|1≤j≤4} with all values as −∞, and setting C to zero, the instruction loop is performed.

For s=1, O[KID[1]]=O[1]=−∞, so C is incremented from 0 to 1, and O[1] is set to P[1]. Since C=1<4, sub-instructions 7a and 7b are not performed.

For s=2, O[KID[2]]=O[3]=−∞, so C is incremented from 1 to 2, and O[3] is set to P[2]. Since C=2<4, sub-instructions 7a and 7b are not performed.

For s=3, O[KID[3]]=O[3]=P[2], so C stays at 2, and O[3] is changed to P[3]. Since C=2<4, sub-instructions 7a and 7b are not performed.

For s=4, O[KID[4]]=O[2]=−∞, so C is incremented from 2 to 3, and O[2] is set to P[4]. Since C=3<4, sub-instructions 7a and 7b are not performed.

For s=5, O[KID[5]]=O[1]=P[1], so C stays at 3, and O[1] is changed to P[5]. Since C=3<4, sub-instructions 7a and 7b are not performed.

For s=6, O[KID[6]]=O[2]=P[4], so C stays at 3, and O[2] is changed to P[6]. Since C=3<4, sub-instructions 7a and 7b are not performed.

For s=7, O[KID[7]]=O[4]=−∞, so C is incremented from 3 to 4, and O[4] is set to P[7]. Since C=4, sub-instructions 7a and 7b are performed. Per sub-instruction 7a, MIN is set to P[3]. Per sub-instruction 7b, since P[7]−MIN≤R, the function returns the sequence {P[5], P[6], P[3], P[7]}.

Range-and-Order-Dependent Keyword Matching

The range-and-order-dependent keyword match function 424 may be configured to determine whether or not all listed keywords are matched in order within a specified range of characters. For one implementation of the range-and-order-dependent keyword match function 424, the inputs and outputs of the function are given below in Table 3, and pseudo-code instructions showing the steps of the algorithm applied are given below in Table 4.

Input:
1. The number M which is the size of the keyword dictionary
2. A keyword instance sequence S={<KID[s],P[s]>|1≤s≤N} where {P[s]|1≤s≤N} is in strictly ascending order
3. Positive integer R Output:
NULL or the sequence {O[j]|1≤j≤M}

Table 3

Pseudo-Code Instructions:
1. If N<M, return NULL
2. If M=1, return P[1]
3. Set C=0
4. Set s=1
5. IF C=1 AND KID[s]=1, THEN O[C]=P[s]
6. IF KID[s]=C+1, THEN
   a. Set C=C+1
   b. Set O[C]=P[s]
7. IF C=M AND O[C]−O[1]≤R, THEN return the sequence {O[j]|1≤j≤M}
8. IF C>1 AND O[C]−O[1]>R, THEN
   a. Set C=0
   b. Set s=O[1]+1,
9. ELSE set s=s+1
10. IF s>N, return NULL
11. GOTO step 5

Table 4

As shown in Table 3, the inputs and outputs for the range-and-order-dependent keyword matching function may be the same as the inputs and outputs for the range-dependent keyword matching function (shown in Table 1).

As seen in Table 4, the first pseudo-code instruction (1) determines if the number N of keyword instances in the keyword instance sequence is less than the number of keywords in the list. If so, then the match conditions cannot be met, so the function may return a NULL value to indicate that no match is found.

The second pseudo-code instruction (2) checks to see whether there is only one keyword in the list (i.e. whether M=1). If so (and since N≤M per the first instruction), then the first keyword instance in the sequence must be that one keyword. Hence, if M=1, then the function returns the offset position of the first keyword instance (i.e. P[1]).

The third pseudo-code instruction (3) initializes a count C (which tracks the number of the listed keywords that have been found in order) at zero. The fourth pseudo-code instruction (4) initializes the pointer s (which indicates the current keyword instance being processed) at one.

The fifth pseudo-code instruction (5) determines whether both C=1 and KID[s]=1. If both are true, then the first identified offset O[C]=O[1]=P[s]. In other words, if the procedure is looking for the second listed keyword, and the current keyword instance corresponds to the first listed keyword, then the first identified offset is reset to the offset position of the current keyword instance.

The sixth pseudo-code instruction (6) determines whether KID[s]=C+1. In other words, does the current keyword instance correspond to the keyword currently being searched (i.e. the next keyword to be identified in the sequence). If so, then pseudo-code sub-instructions 6a and 6b are performed. Pseudo-code sub-instruction 6a increments the count C by one, and pseudo-code sub-instruction 6b sets the identified offset O[C] to the offset position P[s] of the current keyword instance. The sixth pseudo-code instruction ignores keywords other than the (C+1)-th keyword.

The seventh pseudo-code instruction (7) determines whether C=M and O[C]−O[1]≤R. In other words, does the count C indicate that all M listed keywords have been identified, and is the difference between the first and last identified offsets less than or equal to the range R? If so, then the match conditions have been met in that all M listed keywords have been found in order within the specified range R. In that case, the function returns the identified sequence {O[j]|1≤j≤M}.

The eight pseudo-code instruction (8) determines whether the count C>1 and O[C]−O[1]>R. In other words, is the procedure looking for at least the third listed keyword, and is the difference between the latest identified offset and the first identified offset greater than the range R? If so, then the pseudo-code sub-instructions 8a and 8b are performed. Pseudo-code sub-instruction 8a resets C=0, and pseudo-code sub-instruction 8b sets the pointer s to be O[1]+1. In other words, do the identified keywords already span a number of characters that is greater than the range? If so, then the search is restarted from the keyword instance immediately after the first identified offset. Otherwise, per the ninth pseudo-code instruction (9), if C≤1 or O[C]−O[1]≤R, then the pointer s is incremented by one (s=s+1).

The tenth pseudo-code instruction (10) determines if the current instance s is greater than the number N of keyword instances in the input sequence S. If so, then the sequence has been fully processed without satisfying the match conditions. The function then returns a NULL value. The NULL value indicates that all M of the listed keywords were not found in order within the specified range. Otherwise, per the eleventh pseudo-code instruction (11), the procedure loops back to perform the fifth pseudo-code instruction (5) so as to search for the next listed keyword.

Figure 6:
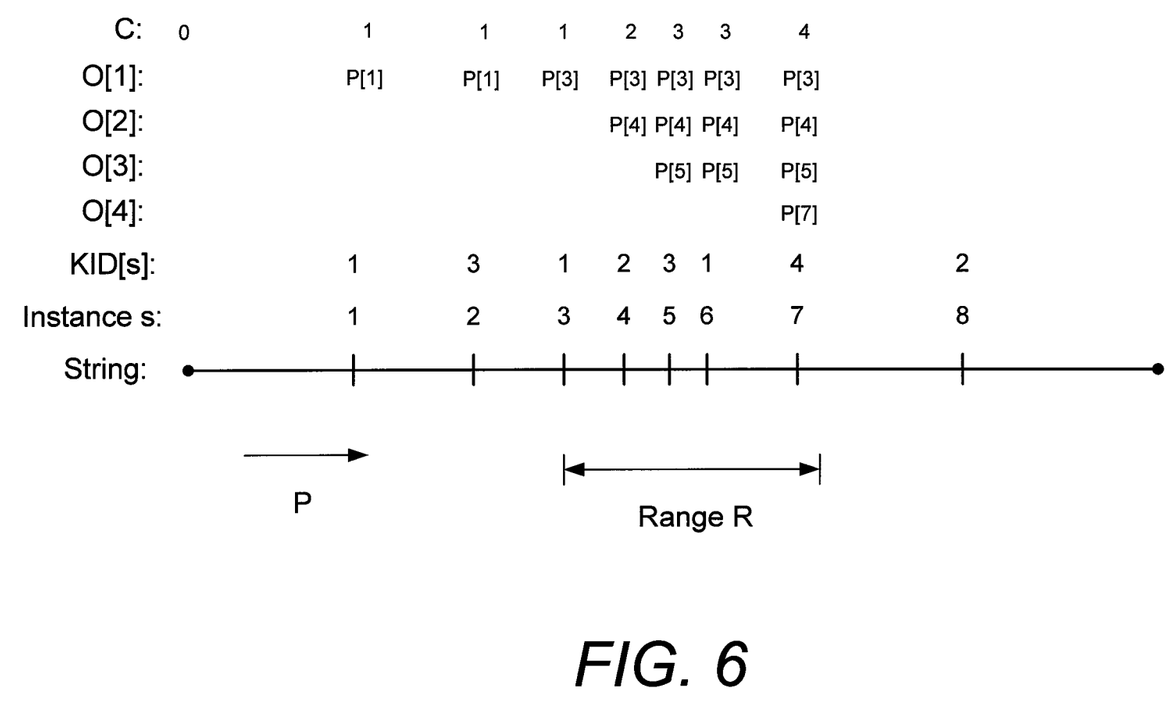
FIG. 6 shows a representation of an example sequence of keywords to which a range-and-order-dependent keyword match function may be applied in accordance with an embodiment of the invention.

FIG. 6 shows a representation of an example sequence of keywords to which a range-and-order-dependent keyword match function may be applied in accordance with an embodiment of the invention. Similar to FIG. 5, the input string is represented by the line segment shown, where the position on the line segment represents the offset position P in the string. In this example, the keyword instance sequence (S={<KID[s],P[s]>|1≤s≤8}) generated from the string is indicated by the tick marks numbered with instance pointer s going from 1 through 8. The example keyword dictionary lists four keywords (i.e. M=4), and those four keywords in order have KID=1, 2, 3 and 4, respectively.

Consider the pseudo-code procedure of Table 4 being performed on the example sequence in FIG. 6. The discussion below focuses on the most pertinent steps performed for this example.

At the beginning, C=0 and s=1.

For s=1, both KID[1]=1 and C+1=1. Hence, per instruction 6, C is incremented from 0 to 1, and O[1] is set to P[1].

For s=2, KID[2]=3 while C+1=2. Neither C nor {O[j]|1≤j≤4} changes.

For s=3, C=1 and KID[3]=1. Hence, per instruction 5, O[1] is changed to P[3].

For s=4, both KID[4]=2 and C+1=2. Hence, per instruction 6, C is incremented from 1 to 2, and O[2] is set to P[4].

For s=5, both KID[5]=3 and C+1=3. Hence, per instruction 6, C is incremented from 2 to 3, and O[3] is set to P[5].

For s=6, KID[6]=1 while C+1=3. Neither C nor {O[j]|1≤j≤4} changes.

For s=7, both KID[7]=4 and C+1=4. Hence, per instruction 6, C is incremented from 3 to 4, and O[4] is set to P[7]. As a result, C=4, and O[4]−O[1]≤R. Hence, per instruction 7, the function returns the sequence {P[3], P[4], P[5], P[7]}.

While specific embodiments of the present invention have been provided, it is to be understood that these embodiments are for illustration purposes and not limiting. Many additional embodiments will be apparent to persons of ordinary skill in the art reading this disclosure.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

What is claimed is:

1. An apparatus configured to match a list of keywords against a target document, the apparatus comprising:
    data storage configured to store computer-readable instruction code and data;
    a processor configured to access the data storage and to execute said computer-readable instruction code;
    a keyword searcher implemented using the instruction code and configured to receive the list of keywords and a textual string corresponding to the target document file, and search the textual string for instances of the keywords so as to generate a sequence of keyword instances;
    a keyword object generator implemented using the instruction code and configured to receive the sequence of keyword instances, and generate a keyword object, wherein the keyword object includes a range-dependent match function.

2. The apparatus of claim 1, wherein the keyword object further includes a first attribute comprising a list of keywords and a second attribute comprising the sequence of keyword instances.

3. The apparatus of claim 1, wherein the range-dependent-match function is configured to return an ordered sequence of offset values for the identified keywords if match conditions are met.

4. The apparatus of claim 1, wherein the range-dependent match function is order independent.

5. The apparatus of claim 4, wherein the range-dependent match function comprises a procedure which is configured to perform an instruction loop up to once per keyword instance in the sequence, and is further configured to use a counter to count a number of different identified keyword instances and an array of offsets to keep track of position offsets for the different identified keyword instances.

6. The apparatus of claim 5, wherein the procedure is further configured to increment the counter if no previous keyword instance with a same keyword identifier has been identified.

7. The apparatus of claim 1, wherein the range-dependent match function is both range and order dependent.

8. The apparatus of claim 7, wherein the range-dependent match function comprises a procedure which is configured to use a counter to count a number of keyword instances identified in order and an array of offsets to keep track of position offsets for the identified keyword instances.

9. The apparatus of claim 8, wherein the procedure is further configured to increment the counter if a keyword identifier for a current keyword instance is equal to the counter's value plus one.

10. A method for matching a list of keywords against a target document, the method being performed using a computer including at least a processor, data storage, and computer-readable instructions, and the method comprising:
    a computer-implemented keyword searcher receiving a textual string corresponding to a target document file;
    the keyword searcher receiving a list of keywords;
    the keyword searcher searching the string for instances of the keywords so as to generate a sequence of keyword instances;
    a computer-implemented keyword object generator receiving the sequence of keyword instances; and
    the keyword object generator generating a keyword object, wherein the keyword object includes a range-dependent match function.

11. The method of claim 10, wherein the keyword object further includes a first attribute comprising a list of keywords and a second attribute comprising the sequence of keyword instances.

12. The method of claim 10, wherein the range-dependent-match function returns an ordered sequence of offset values for the identified keywords if match conditions are met.

13. The method of claim 10, wherein the range-dependent match function is order independent.

14. The method of claim 10, wherein the range-dependent match function is both range and order dependent.

* * * * *